United States Patent Office 2,695,837
Patented Nov. 30, 1954

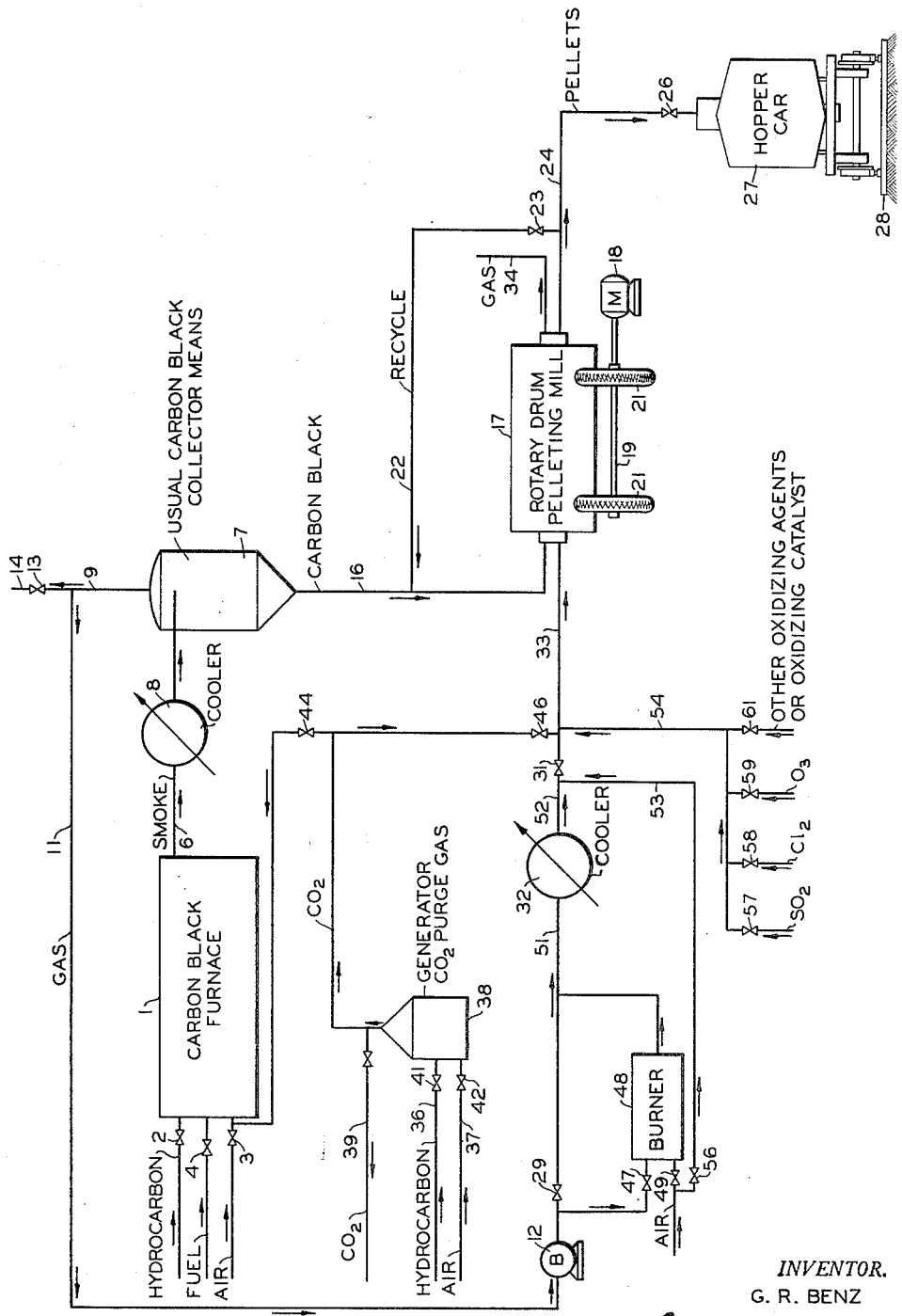

2,695,837

PROCESS FOR PRODUCING PELLETED FURNACE CARBON BLACK

George R. Benz, Bartlesville, Okla., assignor to Phillips Petroleum Company, a corporation of Delaware Application April 2, 1951, Serial No. 218,786

12 Claims. (Cl. 23—314)

This invention relates to processes for producing pelleted furnace carbon black. In one aspect it relates to processes for dry pelleting high modulus furnace carbon black known also as high structure or chain carbon black. In another aspect it relates to integrating and combining the carbon black producing process with the carbon black dry pelleting process to give an over all improved result. In some of its broad aspects, this invention may be regarded as a modification of the process disclosed and claimed in application Serial No. 19,983, filed April 9, 1948, of Merton L. Studebaker, now United States Patent 2,642,343 of June 16, 1953, and in some respects the surface treatment of the carbon black is similar to the surface treatment of the carbon black described and claimed in application Serial No. 67,674, filed December 28, 1948, by Martin R. Cines, and No. 87,473, filed April 14, 1949, by Martin R. Cines, now United States Patent 2,641,535 of June 9, 1953.

In the prior art there are six general ways of manufacturing carbon black. These are the channel black process in which gas flames impinge on a moving cold steel channel in an atmosphere containing combustion products and the deposited smoke is scraped continuously from the channel to provide the carbon black. The second process is the thermal decomposition process in which hydrocarbon vapors are subjected to heat alone to decompose the same into carbon black. The third process involves the subjecting of the hydrocarbon to the action of an electric arc to form carbon black. The fourth process involves the explosive degeneration of acetylene into carbon black. The fifth process is the explosion of hydrocarbons and air or oxygen in a strong vessel to form carbon black. The sixth process, with which the present invention is concerned, is the furnace carbon black process which operates by a continuous pyrolitic conversion of a hydrocarbon in the vaporous state into carbon black in a furnace zone in the presence of incomplete combustion, the combustion being either that of a portion of the hydrocarbon feed stock or the combustion of fuel.

It has been found that furnace process carbon blacks are particularly hard to pellet, whereas there is no difficulty in dry pelleting channel black merely by cascading the same in a rotating drum. Furnace process carbon black resists dry pelleting and cannot be pelleted in such a simple manner, the high modulus (HMF) carbon black being particularly difficult to pellet because of its resilient structure. However, the present invention is useful in dry pelleting all types of furnace carbon blacks such as semi-reinforcing (SRF), high elongation (HEF), fine furnace (FF), conductive furnace (CF), reinforcing furnace (RF), and super-abrasion furnace (SAF) carbon blacks. While not limiting myself thereby, it is noted that Isaac Drogin in his book "Today's Furnace Blacks," copyright 1948, Charleston Printing Company, Charleston, West Virginia, on pages 25 and 26, classifies furnace blacks and other carbon blacks in a similar manner.

I have found that the dry pelleting of furnace carbon blacks is greatly facilitated by cascading the same in a rotating drum through which is passed the effluent gas from a carbon black furnace process at a temperature above 175° F. while recycling at least one-half as much carbon black by weight in pelleted form as the weight of the added unpelleted carbon black. I have also found that by adding oxygen, ozone or chlorine with or without oxidizing catalysts to said effluent gas that the pH of the pelleted carbon black may be reduced during the pelleting. This reduction in pH of the pelleted black increases the time during which it may be vigorously mixed with rubbery elastic polymeric materials, such as natural rubber and/or synthetic rubbers, without scorching.

The terms "rubber" and "rubber-like material" as used in the specification and claims refer to natural and synthetic rubbers and elastometers and other polymers having the elastic properties of rubber. The term "synthetic rubbers" refers to synthetically prepared rubber-like materials particularly those having elastic properties and prepared by polymerization or copolymerization of polymerizable materials. Examples of synthetic rubbers are the Buna rubbers, Butyl rubber, neoprene, Thiokol, and the like.

One object of the present invention is to provide an improved process of producing a pelleted furnace carbon black.

Another object is to integrate a furnace black producing process with a dry pelleting process for the same so that advantages are realized in one or both processes.

Another object is to enable the carbon black to be given a surface treatment during dry pelleting so that the scorch time, or time of mixing before scorching occurs, in rubbery materials, will be increased because of the lower pH of the carbon black.

Another object is to provide apparatus for carrying out the above processes in a safe manner without danger of explosions.

Numerous other objects and advantages will be apparent to those skilled in the art upon reading the accompanying specification, claims and drawing.

The single figure in the drawing is a diagrammatic illustration of a carbon black plant embodying the present invention.

In this drawing a carbon black furnace 1 is supplied with suitable amounts of hydrocarbon through valve 2 and air, or other free oxygen containing gas such as oxygen, through valve 3. Any type of carbon black furnace may be employed in which the hydrocarbon is converted pyrolitically in a vaporous state into carbon black in the presence of incomplete combustion either of a portion of said hydrocarbon or the incomplete or complete combustion of an added fuel through valve 4 which may be a portion of said hydrocarbon. The showing of furnace 1 and valves 2, 3 and 4 in the drawing is schematic, as the hydrocarbon may pass axially through the center of the furnace and the air, without or with the fuel, may pass as an annular sheath through the furnace around the hydrocarbon, or may be introduced tangentially into the furnace. The fuel and air may be mixed turbulently and burned with a turbulent flame into which the hydrocarbon is then injected radially or at any angle as in some carbon black furnaces. Or the hydrocarbon and air with or without fuel may be injected in alternate laminar sheets and burned therein with laminar flames and viscous flow of fluids instead of the generally preferred turbulent burning. The hydrocarbon may be a distillate oil, a residual oil, a gas, or mixtures thereof. While it is preferred that its content be somewhat aromatic, this is not essential, merely resulting in higher yields of carbon black. When a distillate oil is employed as hydrocarbon 2 it can be atomized or preheated and flashed into vapor in the furnace or vaporized before entering the furnace, but obviously when a residual oil is employed it must be atomized or sprayed into the furnace. The same is true of fuel 4 when employed.

The resulting smoke containing suspended particles of carbon black passes through conduit 6 on its way to the usual carbon black collecting means 7. In order to stop the reaction and/or reduce the danger of damage or explosion and the cost of the conduit means, it is conventional to provide a cooler 8 in conduit 6 which may be in any one of forms known in the prior art. Cooler 8 may be entirely indirect heat exchange through conduit 6 to the atmosphere, but generally it is preferred to water jacket a portion of said conduit 6 and/or inject water directly into the smoke in conduit 6 to cool the same, various combinations being employed. The temperature in portions of carbon black furnace 1 may range from about 2000° to 3000° F. and it is desirable that the gases leaving separating means 7 through conduit 9 be below 600° F. depending on the type of carbon black collecting means employed, and above the dew point of the gases.

The usual carbon black collecting means may employ various combinations of electric precipitators and/or cyclone separators and/or bags or screens. In some cases it may prove undesirable to operate the electric precipitator above 450° F. or some other temperature spaced below 500° F. but operation of a precipitator above 500° F. is feasible. However, if wool bags are employed, lower temperatures are needed to prevent destruction of the same, although fibrous bags made of glass or asbestos will permit higher temperatures of about 500° F.

Gas 9 passes through conduit 11 and blower 12 but a large portion of the same passes through valve 13 and conduit 14 to a stack where it is vented to the atmosphere, or to some use as fuel gas or synthesis gas in another portion of the plant (not shown).

The carbon black separated by means 7 passes through conduit 16 and is introduced into a rotating drum 17 where it forms a bed which is tilted and the surface cascaded in the conventional manner by the rotation of drum 17 driven by a suitable motor 18, drive shaft 19 and driving wheels 21 shown provided with automobile tires for frictional engagement with and support of drum 17.

I have found that in dry pelleting high modulus furnace (HMF) carbon black that it is essential to recycle through line 22 at least one-half as much carbon black by weight in pelleted form as the weight of said unpelleted carbon black feed entering through line 16, the amount of recycle being controlled at 23 and the remaining pellets passing through line 24 and valve 26 into storage or use as illustrated by hopper car 27 spotted on rail siding 28. In the case of more easily pelleted furnace carbon blacks this amount of recycling may be reduced, and in furnace blacks most resembling channel black the recycling may be eliminated.

With all furnace carbon blacks the present invention improves the dry pelleting in drum 17, but with high modulus furnace (HMF) carbon black, which has high structure, and with similar furnace carbon blacks, I have found it is essential to maintain the temperature of drum 17 and the carbon black therein above about 175° F. at all times in order to obtain a satisfactory commercial result in dry pelleting the carbon black. This is achieved by taking the hot gas from compressor 12, passing the same through valves 29 and 31, cooler 32 and line 33 into pelleting mill 17 where it heats the pelleting mill to the desired temperature and then passes out through vent 34 which may be separated from, or combined with, disposal line 14. While a cooler 32 is illustrated, obviously if the gas passing through valve 29 is already at a suitable temperature it is not necessary to supply any cooling at 32 and the gas may pass through 32 just as though it were a part of conduit 33.

Because gas 11 is combustible it is considered dangerous to add the same to rotary drum 17 without first purging drum 17 with an inert gas, and it is dangerous to cease feeding gas 11 through drum 17 without sweeping drum 17 with an inert purge gas, although such purging is not essential to the present invention if the operator is willing to take the risk of a dangerous explosion. The purge gas is easily supplied by burning hydrocarbon 36 or other fuel along with air 37 in a $CO_2$ generator 38, it being preferable to have a pilot flame burning in generator 38 at all times. The combustion products of the pilot flame pass out stack 39. When purge gas is desired in large quantities, valves 41 and 42 are opened, purge gas is generated, and valves 44 and/or 46 are opened to furnish purge gas to the desired portion of the system. If it is desired merely to purge the pelleting mill 17, valve 46 alone is employed, but the entire system may be purged by closing air valve 3 and opening valve 44, which would be done at the time carbon black furnace 1 is shut down to obviate any chance of explosion in the carbon black cooler means 7.

While satisfactory dry pelleting results can be obtained with any type of furnace carbon black, by employing the above described invention, additional benefits may be obtained by surface treating the carbon black at the time it is being pelleted in pelleting mill 17 by oxidizing the surface to a slight extent which reduces the pH and thereby increases the time the carbon black can be vigorously mixed with rubbery materials without scorching the same. Because gas 11 is a combustible gas this partial oxidation of the carbon black in drum 17 becomes a difficult operation.

I have found that by operating at a temperature below 500° F., which is below the ignition temperature of said gas 11, and by maintaining the free oxygen content of gas 33 below about 5 per cent by volume, that the carbon black in drum 17 can be surface treated to reduce its pH without an explosion or fire occurring due to the presence of the free oxygen in the combustible gas.

In carrying out this operation all of gas 11 can pass through valve 29, or a portion thereof can pass through valve 47 into burner 48 where it can be further burned with air or other free oxygen containing gas such as oxygen, in suitable amounts added through valve 49 whenever it is desired to reduce the combustible content of gas 11 or to increase its temperature. However, if decreasing the combustible content by burner 48 raises the temperature in line 51 unduly, it may be cooled by suitable operation of cooler 32.

For the purpose of surface treating the carbon black, a minor proportion of an oxidizing agent sufficient to reduce the pH of the pelleted black is added to the gas in line 33 or line 52 through lines 53 and/or 54, care being taken that the free oxygen content of the entire mixture in line 33 is maintained below about 5 per cent by volume of the total volume of gases passing through pipe 33. This oxidizing agent may be air or other free oxygen containing gas, such as oxygen, added through line 53 in said suitable amount by adjusting valve 56. Along with or separate from the air may be added other oxidizing agents or oxidizing catalysts such as sulfur dioxide ($SO_2$) added through valve 57, chlorine ($Cl_2$) added through valve 58, or ozone ($O_3$) added through valve 59. Other oxidizing agents or oxidizing catalysts can be added through valve 61.

In applying the present invention to a typical high modulus furnace (HMF) carbon black such as "Philblack A," a typical high abrasion furnace (HAF) carbon black such as "Philblack O" (registered U. S. trademarks for an HMF and an HAF carbon black manufactured by Phillips Petroleum Company, a Delaware corporation), and a super abrasion furnace (SAF) carbon black, analysis shows that the gas 9 has about the following composition:

Table I

| Gas | Volume Percent | | | |
| --- | --- | --- | --- | --- |
| | HMF run 1 | HMF run 2 [1] | HAF | SAF |
| Hydrogen | 15.68 | 13.7 | 12.97 | 10.02 |
| Carbon Monoxide | 13.56 | 11.1 | 11.61 | 10.95 |
| Carbon Dioxide | 4.11 | 3.8 | 5.29 | 6.8 |
| Methane | 0.97 | 0.4 | 0.96 | 0.54 |
| Acetylene | 0.45 | 0.4 | 0.86 | 0.93 |
| Nitrogen | 65.22 | 56.1 | 68.31 | 71.38 |
| Water | ([2]) | 14.5 | ([2]) | ([2]) |

[1] Total quantity of gas 9 in HMF run 2 is 7,000 cubic feet per 100 pounds of hydrocarbon feed 2 when a cracked gas oil comprising aromatics and having API gravity of 16 to 25° and an end point of about 700° F. is used. Similar quantities are produced in the other runs.
[2] Not included.

If the cooling in 8 is entirely indirect heat exchange with fluids such as water or the atmosphere, the content of gas 11 is the same as gas 6. However, if cooling 8 comprises direct injection of water into gas 9 in order to quench the same from 2000° F. or 3000° F. down to about 1500° F. plus indirect heat exchange for further cooling, then the volume per cent of water in gas 11 increases to about 41 per cent. The dew point of gas 11 when said direct injection water quenching is employed will rise as high as about 175° F., but if cooler 8 employs entirely indirect heat exchange the dew point will be lower.

The HMF carbon black produced by the above process without fuel entering through valve 4 is compared in the following table with HAF black produced by a similar process in which such fuel is employed as well as hydrocarbon entering through valve 2, both before any surface treatment of an oxidizing nature has been employed:

Table II

|  | HMF Black | HAF Black |
|---|---|---|
| pH | 9.7 | 9.1 |
| Particle diameter: |  |  |
| mean mu | 51.0 | 34.5 |
| mode mu | 45.0 |  |
| Surface area $N_2$ adsorption method | 39.5 | 82.4 |
| Percent volatile matter | 1.13 | 1.13 |
| Stiff paste oil adsorption, ccs./gm | 1.25 | 1.20 |
| Tint | 114 | 174 |
| Mineral Oil color test | 94 | 124 |
| Iodine No. (mg./gm.) | 41.0 | 91.2 |
| DPG number | 4.2 | 11.3 |
| Acid number | 23.3 | 24.0 |
| Heat of wetting, cal./mg | 0.64 | 1.71 |
| Ash | 0.118 | 0.156 |
| Density: |  |  |
| helium method | 1.95 | 1.98 |
| acetone method | 1.806 | 1.808 |

Note that the pH is above 9.

The gas 33 entering pelleting mill 17 should be at a temperature sufficient to maintain drum 17 and the carbon black therein at a temperature above the dew point, whatever that may be, above 175° F. for better pelleting and below 500° F. When it is desired to combine surface treating to reduce the original pH of about 9 to 7 or below, a preferred range of operation is between about 200° F. and 250° F. unless only air from 56 is being used for said surface treating in an amount giving less than about 5 per cent by volume of free oxygen content in gas 33, in which case it is essential to operate between 400° F. and 500° F. in drum 17. When using oxygen in combination with $SO_2$ or when using chlorine or when using ozone, all in suitable amounts with free oxygen content of the gas stream 33 below about 5 per cent, the temperature in drum 17 may range from 175° F. to 500° F., so for pelleting purposes it is preferred to operate in the same preferred range of 200° F. to 250° F. There need be no free oxygen present at all when treating with chlorine.

A Mooney scorch time test (a standard test) clearly shows the relation between the pH of a carbon black and the Mooney scorch time, as follows:

Table III

| Sample | pH | Mooney scorch time, minutes |
|---|---|---|
| HMF | 9 | 18.5 |
| HMF | 5.1 | 28.5 |
| Channel | 4 | 30 |
| HAF | 2.9 | 43 |

In carrying out my invention I prefer to contact the furnace carbon black in the pelleting drum 17 with a stream of gas 33 containing the above listed components and containing from 0.001 to 5 volume percent of sulfur dioxide and about 5 per cent of free oxygen obtained from air through valve 56. I prefer, however, to use 0.01 to 2 per cent by volume of sulfur dioxide in this mixture of gases passing through pipe 33. While the amount of free oxygen in gases 33 can be reduced below 5 per cent by considebale amounts, it is not desirable, as less amounts give correspondingly less treating effect.

In all of these treating processes, the treating process is continued until the pH of the pelleted carbon black 24 is substantially reduced, preferably to a value between a pH of 2 and the neutral pH of 7. The conversion of the alkaline carbon black to an acid or neutral carbon black results in a great improvement in extending the scorch time and general utility of the carbon black in rubber compounding and often results in noticeable hardening of the pellets in the pelleted black, making them easier to ship without breakage in such vehicles as hopper cars.

In employing ozone the only additive necessary to gas 33 can be the ozone in quantities giving gas 33 a free oxygen content below about 5 per cent. By free oxygen content it is intended to include ozone as a species of free oxygen, and obviously the greater the proportion of ozone in this free oxygen content the more effective the surface treatment of the carbon black will be and the lower the temperature of drum 17 might be, as when the free oxygen content is all oxygen supplied by air 56 the temperature of drum 17 will have to be 400° F. to 500° F. in order to obtain treatment in a satisfactorily short length of time. 1% ozone permits treating at 175° F.

Treatment of both HMF and HAF carbon black with chlorine indicates that this treatment is equally effective whether free oxygen is present or absent, and that the treatment can be carried out at temperatures ranging from 70° F. to 500° F., but preferably from 200° F. to 250° F. In order to show the presence of oxygen to be unnecessary, reference is made to the following test:

Table IV

[Effect of chlorine in pre-purified nitrogen on the pH of HAF carbon black ("Philblack O," registered U. S. trade-mark product of Phillips Petroleum Co.)]

| Run No. | Treating Gas | Gas composition (Mol Percent $Cl^2$) | Cu. ft. $Cl^2$ per lb. black (s. c. f.) | Treating Temp., °F. | Treating Time, min. | pH Before Treatment | pH After Treatment |
|---|---|---|---|---|---|---|---|
| 3560-12a | $Cl^2$–$N^2$ | 1.1 | 1.01 | 75 | 10 | 9.1 | 4.8 |

Such portion of the chlorine as may react with the hydrogen in gas 33 to form hydrogen chloride will add its effect to the lowering of the pH of the carbon black, because hydrogen chloride gas also lowers the pH of carbon black treated therewith, as described in application Serial No. 131,129, filed December 5, 1949, by George N. Cade, now United States Patent 2,587,107 of February 26, 1952, in the fifth from last paragraph of the specification.

While a particular system and its various component parts have been shown in considerable detail, this has been done for the purpose of illustration of the invention, which invention is not limited thereto but is defined by the following claims.

Having described my invention, I claim:

1. The process of producing a pelleted furnace carbon black which comprises the steps of pyrolytically converting a hydrocarbon in the vaporous state into carbon black in a furnace zone in the presence of incomplete combustion, separating said carbon black from the resulting gases of the resulting smoke of said conversion, feeding said carbon black into a dry pelleting zone, dry pelleting said carbon black therein by cascading the same in a rotating drum, recycling to said pelleting zone at least one-half as much carbon black by weight in pelleted form as the weight of said unpelleted carbon black fed thereinto from said separation, heating said carbon black in said pelleting zone above about 175° F. by passing said resulting gases through said pelleting zone in contact with the carbon black therein, and collecting pelleted carbon black from said pelleting zone.

2. The process of claim 1 in which a minor proportion of an oxidizing agent sufficient to reduce the pH of the pelleted black but with a free oxygen content below about 5 per cent by volume is introduced with said resulting gases into said pelleting zone at a temperature below 500° F. which is below the ignition temperature of said resulting gases.

3. The process of claim 2 in which the oxidizing agent is selected from the group consisting of oxygen, ozone, and chlorine gases.

4. The process of claim 3 in which said resulting gases are combustible and in which a portion of said resulting gases are burned with a free oxygen containing gas before introduction into said pelleting zone.

5. The process of claim 1 in which said resulting gases are combustible and in which a portion of said resulting gases are burned with a free oxygen containing gas before introduction into said pelleting zone.

6. The process of claim 1 in which said resulting gases are combustible and in which the introduction of said resulting gases into the pelleting zone is proceeded and followed by the introduction into said pelleting zone and the sweeping out thereof by an inert purge gas.

7. The process of producing a pelleted furnace carbon black which comprises the steps of pyrolytically converting a hydrocarbon in the vaporous state into carbon black in a furnace zone in the presence of incomplete combustion, separating said carbon black from the resulting gases of the resulting smoke of said conversion, feeding said carbon black into a dry pelleting zone, dry pelleting said carbon black therein by cascading the same in a rotating drum, heating said carbon black in said pelleting zone above about 175° F. by passing said resulting gases through said pelleting zone in contact with the carbon black therein, and collecting pelleted carbon black from said pelleting zone.

8. The process of claim 7 in which a minor proportion of an oxiding agent sufficient to reduce the pH of the pelleted black but with a free oxygen content below about 5 per cent by volume is introduced with said resulting gases into said pelleting zone at a temperature below 500° F. which is below the ignition temperature of said resulting gases.

9. The process of claim 8 in which the oxidizing agent is selected from the group consisting of oxygen, ozone, and chlorine gases.

10. The process of claim 9 in which said resulting gases are combustible and in which a portion of said resulting gases are burned with a free oxygen containing gas before introduction into said pelleting zone.

11. The process of claim 7 in which said resulting gases are combustible and in which a portion of said resulting gases are burned with a free oxygen containing gas before introduction into said pelleting zone.

12. The process of claim 7 in which said resulting gases are combustible and in which the introduction of said resulting gases into the pelleting zone is proceeded and followed by the introduction into said pelleting zone and the sweeping out thereof by an inert purge gas.

References Cited in the file of this patent

UNITED STATES PATENTS

| Number | Name | Date |
| --- | --- | --- |
| 2,144,971 | Heller et al. | Jan. 24, 1939 |
| 2,408,696 | Smallwood | Oct. 1, 1946 |
| 2,486,205 | Prosk | Oct. 25, 1949 |
| 2,503,361 | Studebaker | Apr. 11, 1950 |
| 2,511,088 | Whaley, Jr. | June 13, 1950 |

OTHER REFERENCES

Chemical Engineering, vol. 59, No. 9, September 1950, pages 203 and 205.

Cabot et al., "J. Institute of Petroleum," vol. 36, No. 324, December 1950, pages 707–726.